United States Patent [19]

Schimmel

[11] Patent Number: 5,960,434
[45] Date of Patent: Sep. 28, 1999

[54] SYSTEM METHOD AND COMPUTER PROGRAM PRODUCT FOR DYNAMICALLY SIZING HASH TABLES

[75] Inventor: Curt F. Schimmel, San Ramon, Calif.

[73] Assignee: Silicon Graphics, Inc., Mountain View, Calif.

[21] Appl. No.: 08/938,672

[22] Filed: Sep. 26, 1997

[51] Int. Cl.[6] .................................. G06F 17/30
[52] U.S. Cl. .................... 707/100; 707/101; 707/102; 707/103
[58] Field of Search .................... 707/100, 101, 707/102, 103

[56] References Cited

U.S. PATENT DOCUMENTS

| | | | |
|---|---|---|---|
| 4,996,663 | 2/1991 | Nemes | 364/900 |
| 5,121,495 | 6/1992 | Nemes | 707/100 |
| 5,197,002 | 3/1993 | Spencer | 364/406 |
| 5,265,245 | 11/1993 | Nordstrom et al. | 707/101 |
| 5,287,499 | 2/1994 | Nemes | 707/100 |
| 5,511,190 | 4/1996 | Sharma et al. | 707/102 |
| 5,612,865 | 3/1997 | Dasgupta | 364/184 |
| 5,623,545 | 4/1997 | Childs et al. | 380/2 |
| 5,706,462 | 1/1998 | Matousek | 395/445 |

OTHER PUBLICATIONS

Keller, Fast Rehashing in PRAM Emulations, IEEE, pp. 626–631, Dec. 1993.

Chung et al, Dynamic Signature Hashing, IEEE, pp. 257–262, Sep. 1989.

Primary Examiner—Thomas G. Black
Assistant Examiner—Frantz Coby
Attorney, Agent, or Firm—Sterne, Kessler, Goldstein & Fox, P.L.L.C.

[57] ABSTRACT

The present invention is a system, method, and computer program product for dynamically sizing a hash table when the average number of records per bucket in the hash table exceeds a maximum average number of records per bucket. In one embodiment, the hash table employs a modulo hashing function. In a second embodiment, the number of buckets is grown by a multiple of the previous number of buckets and records are re-hashed using a lazy re-hashing modulo algorithm that re-hashes records in a hash bucket only when those records are searched. In the second embodiment, when a hash table is re-sized, each new bucket is provided with a logical back pointer, or index, to a pre-existing bucket that potentially contains records that belong in the new bucket. When a search is directed at a new bucket, the logical back pointer, or index, directs the search to a pre-existing bucket. When a search of a pre-existing bucket finds a data record that belongs in a new bucket, the record is moved to the new bucket. When there are no more records in a pre-existing bucket that belong in a new bucket, the logical back pointer from the new bucket to the pre-existing bucket is removed. Preferably, the logical back pointer is stored in the bucket where a regular pointer would normally be stored so that no extra space is needed.

24 Claims, 15 Drawing Sheets

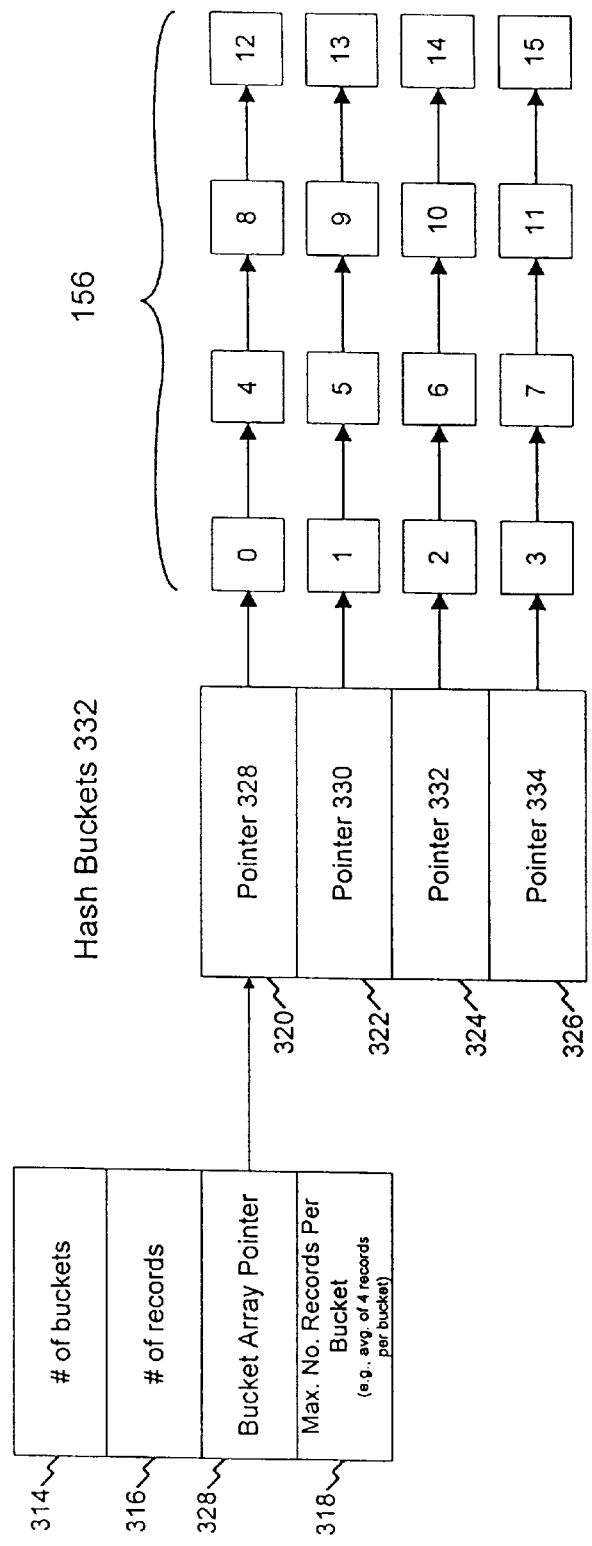

SYSTEM METHOD AND COMPUTER PROGRAM PRODUCT FOR DYNAMICALLY SIZING HASH TABLES

BACKGROUND OF THE INVENTION

1. Field of the Invention

The present invention relates to computer data structures and algorithms. More particularly, the present invention relates to hash tables and hashing functions and, more specifically, to dynamically-sized hash tables and lazy rehashing algorithms.

2. Related Art

Hash tables employ hashing functions, or algorithms, to store and search for records based on a key within or assigned to each record. Records can include, for example, employee records such as payroll records, data structures such as page frame data structures, words from a dictionary, et cetera. Page frame data structures are data structures that store identification and state information for pages of memory, or page frames. Keys can be numbers or words. For example, where records are employee payroll records, a key can be an employee identification number. Where records are page frame data structures, a key can be a logical offset of a page of a memory object that is stored in a page of memory that is represented by the page frame data structure.

Hashing functions include open hashing functions and closed hashing functions. An open hashing function typically distributes records within a hash table array according to a hashing algorithm and the number of hash buckets in the hash table. Each hash bucket includes a pointer to a linked list of stored records. Each record is hashed to a hash bucket based on the key value of the record. A bucket can associate any number of records in its linked list. A record having a particular key value will always be associated with a particular bucket. A hash table is allocated with a desired number of buckets. Records can be added to the hash table as necessary.

When searching for a record in a hash table, a key value for the record is provided to the hashing function. The hashing function identifies a bucket to search in. The bucket provides a starting point for the search. If the record exists in the hash table, it will be associated with the identified hash bucket. The search for the record begins with the first record in the linked list associated with a hash bucket and continues with successive records in the linked list until the record is found or until the search has exhausted all of the records in the linked list. If the search identifies the record, the record can be accessed. If the record is not found among the linked list of records associated with the bucket, the record is not in the hash table. Since records are distributed among a number of hash buckets, and since a search for a particular record is immediately narrowed to a search of only one of the hash buckets, hashing functions limit the amount of searching necessary to find a record. Hash tables are thus compact data structures that can be used to store and retrieve data in an organized fashion.

So long as the number of records within the hash buckets remains manageable, the linked list of records in the bucket can be searched in a relatively short period of time. However, as the number of records in the hash bucket increases, the amount of time required to search a linked list of the hash bucket also increases. Thus, in conventional hashing, it is important to know how many records need to be hashed when setting the number of buckets at initialization. Since the number of hash buckets is fixed at initialization, hash tables are not scalable or dynamic. Although the number of hash buckets could be overestimated to insure that the number of records remains manageable, overestimations result in unused hash buckets which consume valuable memory.

Hashing functions and hash tables are discussed in, for example, Aho, Hopcroft and Ullman, *Data Structures and Algorithms,* Addison-Wesley, at for example, pp. 112–135, 128, 162, 168 and 363–365, (1983), incorporated herein in its entirety by reference; and, Horowitz and Sahni, Data Structures in PASCAL, Computer Science Press, at for example, 425–457, (4th Ed., 1994), incorporated herein in its entirety by reference.

When the number of records to be stored and searched are not known beforehand, tree data structures are generally employed. Tree structures can be easily grown or added to and are thus scalable and have good search times. However, tree structures require numerous pointers, such as, parent pointers, sibling pointers, and child pointers. Thus, although tree structures are flexible and scalable, they take up much more memory space than hash tables. As a result, where very compact data structures are required, hash tables are preferred.

What is needed is a system, method and computer program product for dynamically sizing hash tables in order to keep them as compact as possible and to avoid long bucket links.

SUMMARY OF THE INVENTION

The present invention is a system, method, and computer program product for dynamically sizing a hash table. A dynamically sizeable hash table allows the number of hash buckets to be adjusted dynamically, so that more buckets can be added as the data set size grows. When records are added to a hash table, the number of records in the hash table is checked to determine whether it exceeds a maximum number. The maximum number can be set to, for example, an maximum average number of records per bucket. The maximum number is chosen so that the average bucket linked list does not exceed a desired length. When the number of records exceeds the maximum number, the hash table is dynamically re-sized. In one embodiment, the hash table employs a modulo hashing function which is easy to implement and fast in performance.

In a second embodiment, the number of buckets is grown by a multiple of the previous number of buckets and records are re-hashed using a lazy rehashing modulo algorithm that re-hashes records in a hash bucket only when those records are searched. This avoids unnecessarily re-hashing unused records and spreads the re-hashing out over time.

In the second embodiment, when a hash table is re-sized, each new bucket is provided with a logical back pointer, or index, to a pre-existing bucket that potentially contains records that belong in the new bucket. When a search is directed at a new bucket, the logical back pointer, or index, directs the search to a pre-existing bucket. When a search of a pre-existing bucket finds a data record that belongs in a new bucket, the record is moved to the new bucket. When there are no more records in a pre-existing bucket that belong in a new bucket, the logical back pointer from the new bucket to the existing bucket is removed. Preferably, the logical back pointer is stored in the bucket where a regular pointer would normally be stored so that no extra space is needed. This type of data structure is very effective when a high degree of scaling and space efficiency is needed, and is extremely useful in operating systems.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying figures, wherein:

FIG. 3A is a block diagram of a dynamically-sizable hash table, in accordance with the present invention;

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

1. Overview of the Invention

Figure 1A:
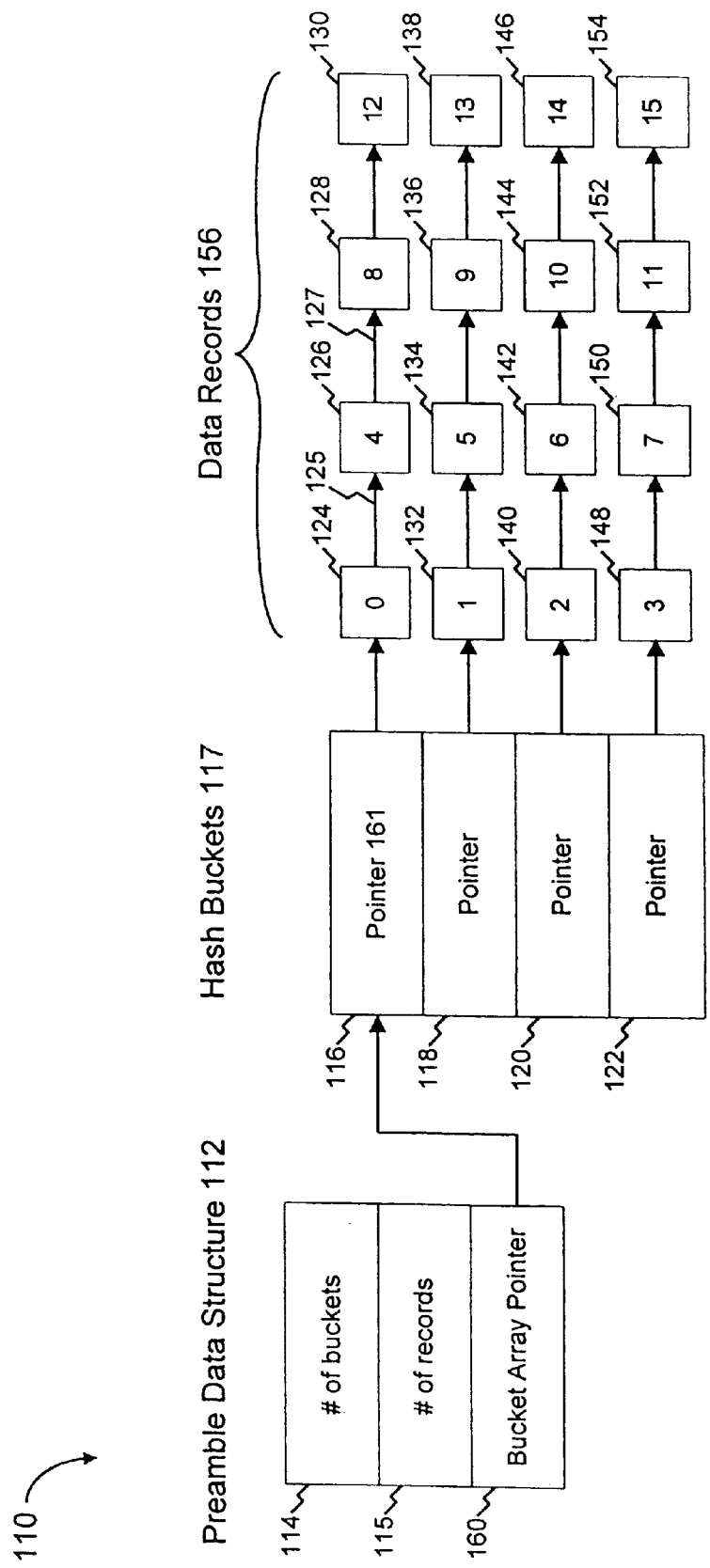
FIG. 1A is a block diagram of a four-bucket hash table.

The present invention is a system, method, and computer program product for dynamically sizing a hash table. A dynamically sizeable hash table allows the number of hash buckets to be adjusted dynamically, so that more buckets can be added as the data set size grows. When records are added to a hash table, the number of records in the hash table is checked to determine whether it exceeds a maximum number. When the number of records exceeds the maximum number, the hash table is dynamically re-sized. In one embodiment, the hash table employs a modulo hashing function which is easy to implement and fast in performance.

In a second embodiment, a dynamically sizable hash table employs a modulo hash function and is re-hashed using a lazy re-hashing algorithm that takes advantage of the properties of a modulo hashing algorithm. In this embodiment, the number of buckets in the hash table is increased as a multiple of the previous number of buckets. For example, if there were three buckets in a hash table, the hash table can be grown to have six, nine, twelve, fifteen, etc. buckets. This allows the code to precisely determine an element's previous location in the hash table so that a full re-hash of all the elements is not necessary. Instead, elements in the hash table are slowly re-hashed over time during subsequent look-up operations. More specifically, the lazy re-hashing algorithm re-hashes records in a hash bucket only when those records are searched. This avoids unnecessarily re-hashing unused records and spreads the re-hashing out over time.

When a hash table is re-sized, each new bucket is provided with a logical back pointer, or index, to a pre-existing bucket that potentially contains records that belong in the new bucket. When a search is directed at a new bucket, the logical back pointer, or index, directs the search to a pre-existing bucket. When a search of the pre-existing bucket finds a data record that belongs in a new bucket, the record is moved to the new bucket. When there are no more records in the pre-existing bucket that belong in the new bucket, the logical back pointer from the new bucket to the pre-existing bucket is removed. Preferably, the logical back pointer is stored in the bucket where a regular pointer would normally be stored so that no extra space is needed. This type of data structure is very effective when a high degree of scaling and space efficiency is needed, and is extremely useful in operating systems.

The present invention can be implemented in a variety of computer systems and environments, including, but not limited to, uni-processor computer systems, shared memory, symmetric multi-processing (SMP) systems and distributed shared memory (DSM) multi-processor systems. For example, the present invention can be implemented as software in an IRIX™ or Cellular IRIX™ operating system executed by an Origin™ scalable, distributed sharedmemory multi-processor platform, manufactured by Silicon Graphics, Inc., Mountain View, Calif.

2. Example Environment

Figure 1B:
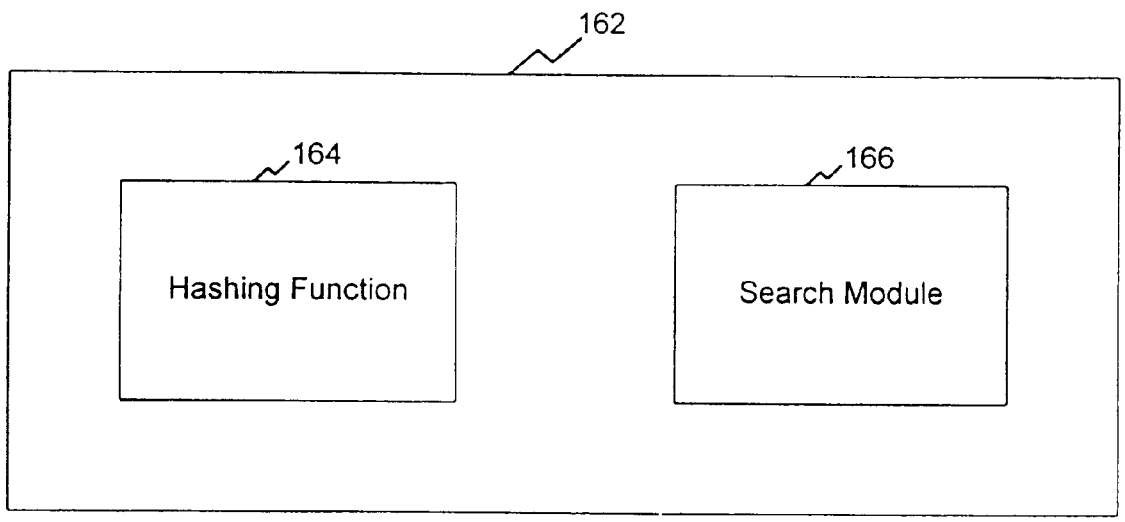
FIG. 1B is a block diagram of a hashing module that includes a hashing function that hashes records in the hash table of FIG. 1A and a search module that searches for records in the hash table of FIG. 1A.

Referring to FIGS. 1A and 1B, a conventional open hash table 110 includes a preamble data structure 112, hash buckets 116–122, collectively referred to as hash buckets 117 or bucket array 117, and data records 124–154, collectively referred to as data records 156. Preamble data structure 112 includes a block 114 that stores a value that indicates the number of hash buckets 117 and a block 115 that stores a value indicating the current number of data records 156 in hash table 110. As data records 156 are added to hash table 110, the value in block 115 is updated. Preamble data structure 112 and hash buckets can be stored together in the same data structure.

Each data record 124–154 is assigned to one of hash buckets 117, based upon a key value within each data record and based upon the number of hash buckets. For example, where as here, a modulo hash function is employed and the number of buckets 117 is four, data record 124, having a key value of 0 is hashed to the first hash bucket 116. Similarly, data record 126, having a key value of 4, data record 128, having a key value of 8, and data record 130, having a key value of 12 are also hashed to first hash bucket 116. Alternatively, any other suitable hashing algorithm can be used by hashing function 164.

Referring to FIG. 1B, a hashing module 162 includes a hash function 164 that hashes records 156 into hash buckets 117 and that identifies hash buckets that potentially contain a data record having a particular key value. Hashing module 162 also includes a search module 166 that searches records 156 within an identified hash bucket for a key value.

Hash table 110 and hashing module 162 are typically implemented in software as part of an operating system or an application program. However, hash table 110 and hashing module 162 can be implemented in software, firmware, hardware or any combination thereof.

When a record is searched for, the key value associated with the record is fed to hashing function 164. Hashing function 164 will return an index to bucket array 117 that selects the bucket that will contain the record if the record exists in hash table 110.

When a bucket is identified by hashing function 164, such as bucket 116, search module 166 uses a pointer associated with the identified hash bucket, such as pointer 161 in hash bucket 116, to identify a first record 124. Search module 166 searches a key field in record 124 to determine whether a key value for record 124 matches the key value being search for. When the key value associated with data record 124 (i.e., 0) is not the key value being searched for, search module 166 uses a pointer 125 associated with data record 124 to identify the next record 126 to be searched. If record 126 does not contain the key value, search module 166 uses a pointer 127 associated with record 126 to identify next record 128 for searching. Pointers such as pointers 161, 125 and 127 thus identify a linked list of records 124, 128, etc.

The search process continues until a record with the key value is found or until there are no more records in the linked list to search. Key values and pointers, such as pointers 125 and 127, can be stored within each data record 156 or within separate data structures (not shown) that can be associated with the data records 156. Although FIG. 1A illustrates records 156 on each hash bucket linked list as being in sorted order by key value, this does not have to be the case. Records 156 can be sorted in any order.

Figure 2:
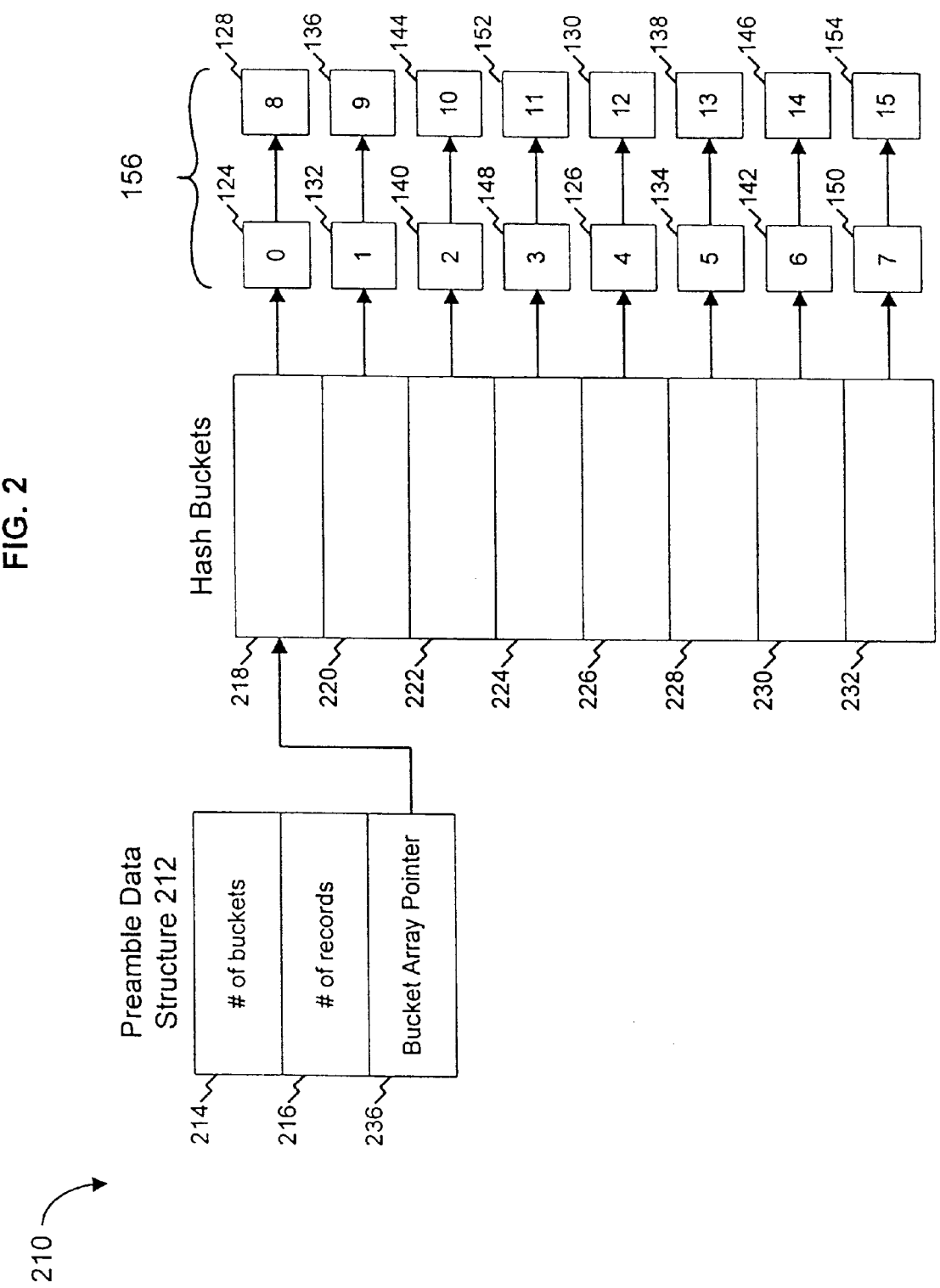
FIG. 2 is a block diagram of an eight-bucket hash table.

Referring to FIG. 2, a hash table 210 employs a hashing function (not shown) which can be, for example, modulo hashing function 164, for hashing data records 156 into eight hash buckets 218–232. Where hash table 210 employs a modulo function and the number of hash buckets 218–232 is eight, data record 126, for example, having a key of 4, is hashed to the fifth hash bucket 226.

In hash tables 110 and 210, additional data records can be added to the hash buckets as needed. However, as additional data records are added to the hash tables, search times increase. In order to keep search times to a minimum, some ratio of data records to hash buckets should be maintained. For example, where employee records are to be hashed, the total number of employees is 10,000, and the desired ratio of data records to hash buckets is eight, the total number of hash buckets should be set to 1,250.

Where the number of data records to be stored in a hash table is known in advance, a ratio of data records to hash buckets can be maintained. However, in many cases, the number of data records to be stored in a hash table cannot be accurately determined in advance. Thus, when dynamic data storage and search functions are required, tree structures are typically employed. However, tree structures are not ideal when compact data structures are required.

3. Dynamically Sized Hash Table

Figure 3B:
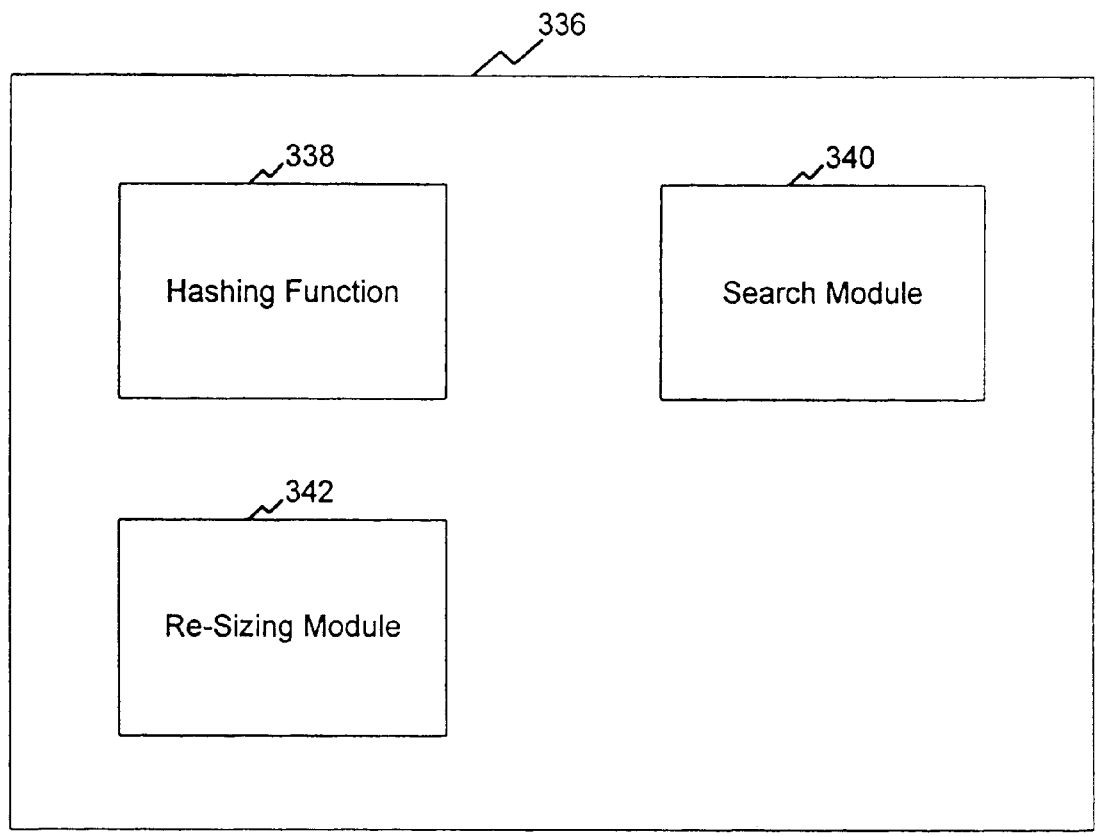
FIG. 3B is a block diagram of a hashing module that includes a re-sizing module, in accordance with the present invention.

Referring to FIG. 3A, a dynamically sizable hash table 310 includes a preamble data structure 312 that includes a block 314 for storing a value that represents the number of hash buckets 332 and a block 316 for storing the current number of records 156 in hash table 310. Hash buckets 320–326 include pointers 328–334, respectively, that point to data records 156. Referring to FIG. 3B, a hashing module 336 includes a hashing function 338 and search module 340. Elements 314, 316, 338 and 340 can be similar to those described with reference to hash tables 110 and 210.

In accordance with the present invention, preamble data structure 312 also includes a block 318 for storing a value that limits the number of data records, such as, for example, a maximum average number of records per bucket. In addition, hashing module 336 includes re-sizing module 342 which includes software, firmware, hardware, or any combination thereof necessary to dynamically grow hash table 310 when the actual average number of data records indicated in block 316 exceeds the maximum value in block 318.

Figure 8:
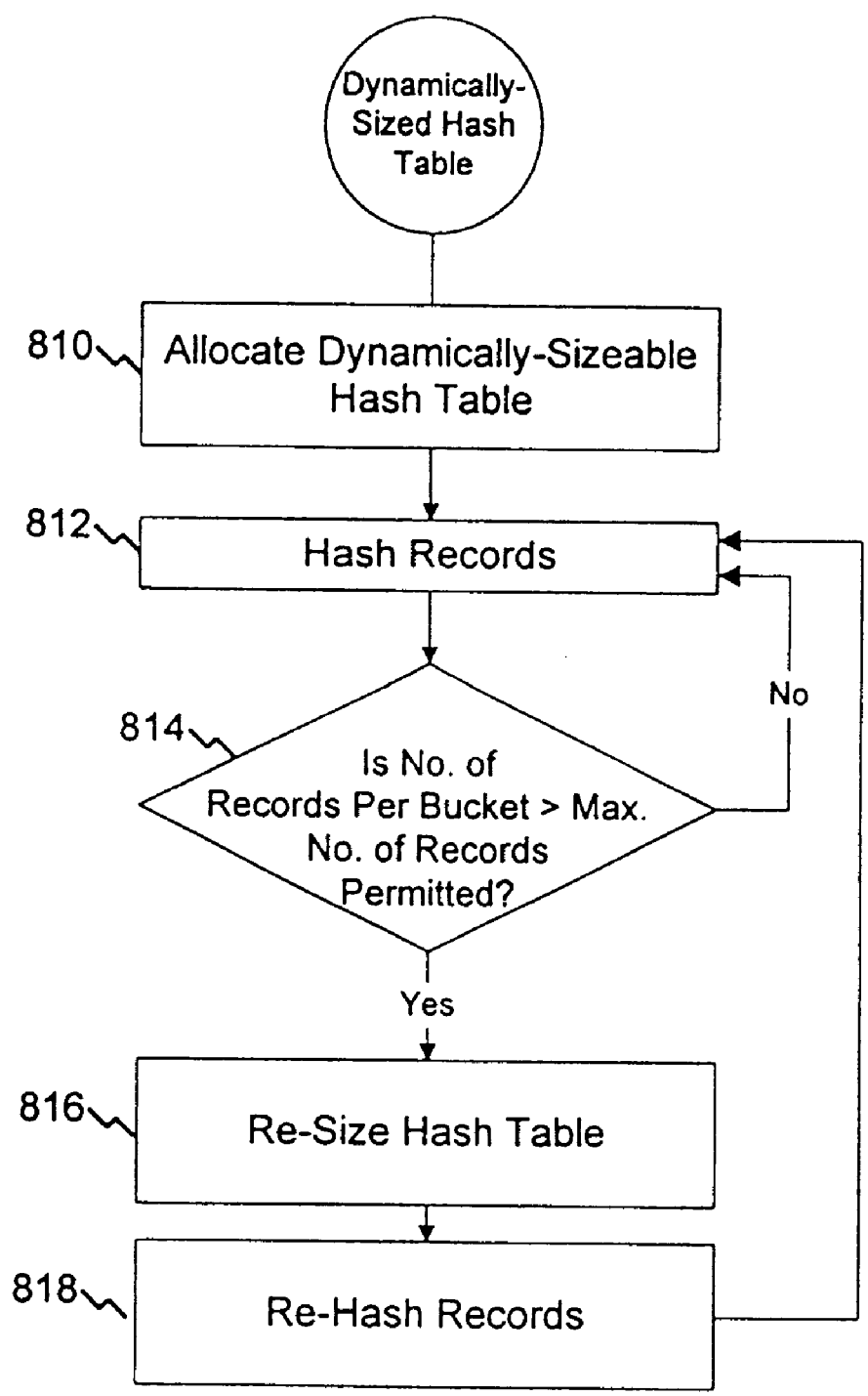
FIG. 8 is a process flowchart illustrating a method for dynamically resizing a hash table, in accordance with the present invention.

Referring to FIG. 8, a process flowchart is provided to illustrate a preferred method for dynamically sizing a hash table such as, for example, hash table 310. The process begins at step 810, where dynamically sizable hash table 310 is allocated. Allocation of hash table 310 is performed by providing a desired initial number of buckets in block 314 and a maximum value in block 318, such as, for example, a maximum average number of records per bucket. In this example, dynamically sizable hash table 310 is allocated with four buckets 320, 322, 324 and 326, and a maximum average number of four records per bucket.

In step 812, records 156 are hashed in hash table 310 as needed. Hashing can include adding data records and searching for data records. When a data record is added to hash table 310, processing proceeds to step 814, where re-sizing module 342 determines whether the actual number of data records 156, from block 316, warrants a re-sizing of hash table 310.

In this example, re-sizing module 342 determines whether the actual average number of data records per bucket exceeds the maximum average number of records per bucket. Re-sizing module 342 can, for example, divide the current number of records in block 316 by the number of allocated buckets in block 314 to determine the actual average number of data records per bucket. Re-sizing module 342 compares the result to the maximum average number of data records per bucket value in block 318. Alternatively, any other suitable process can be employed by re-sizing module 342 to determine whether the actual number of data records in block 316 justifies expansion of hash table 310.

Figure 4A:
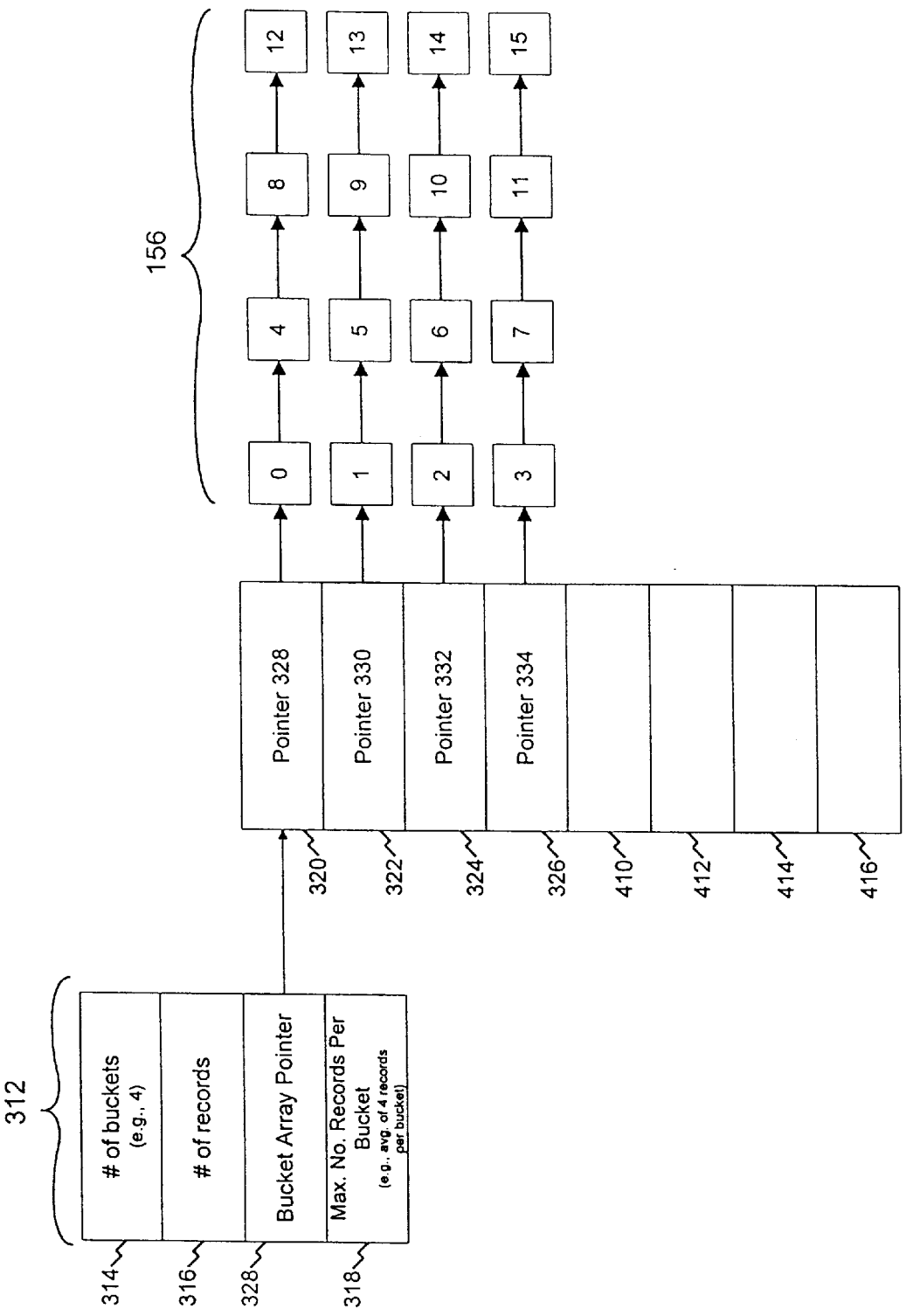
FIG. 4A is block diagram of the dynamically-sizable hash table of FIG. 3A, wherein the number of buckets have been increased by a multiple of two.

As long as the actual average number of data records per bucket is less than the maximum average number of data records per bucket, processing returns to step 812 for hashing of data records in hash table 310. If the actual number of data records 156 exceeds the value in block 318, processing proceeds to step 816, where re-sizing module 342 re-sizes, or grows, hash table 310. Referring to FIG. 4A, hash table 310 is illustrated as re-sized hash table 410 which includes new hash buckets 410, 412, 414 and 416, including pointers 428–434, respectfully.

Figure 4B:
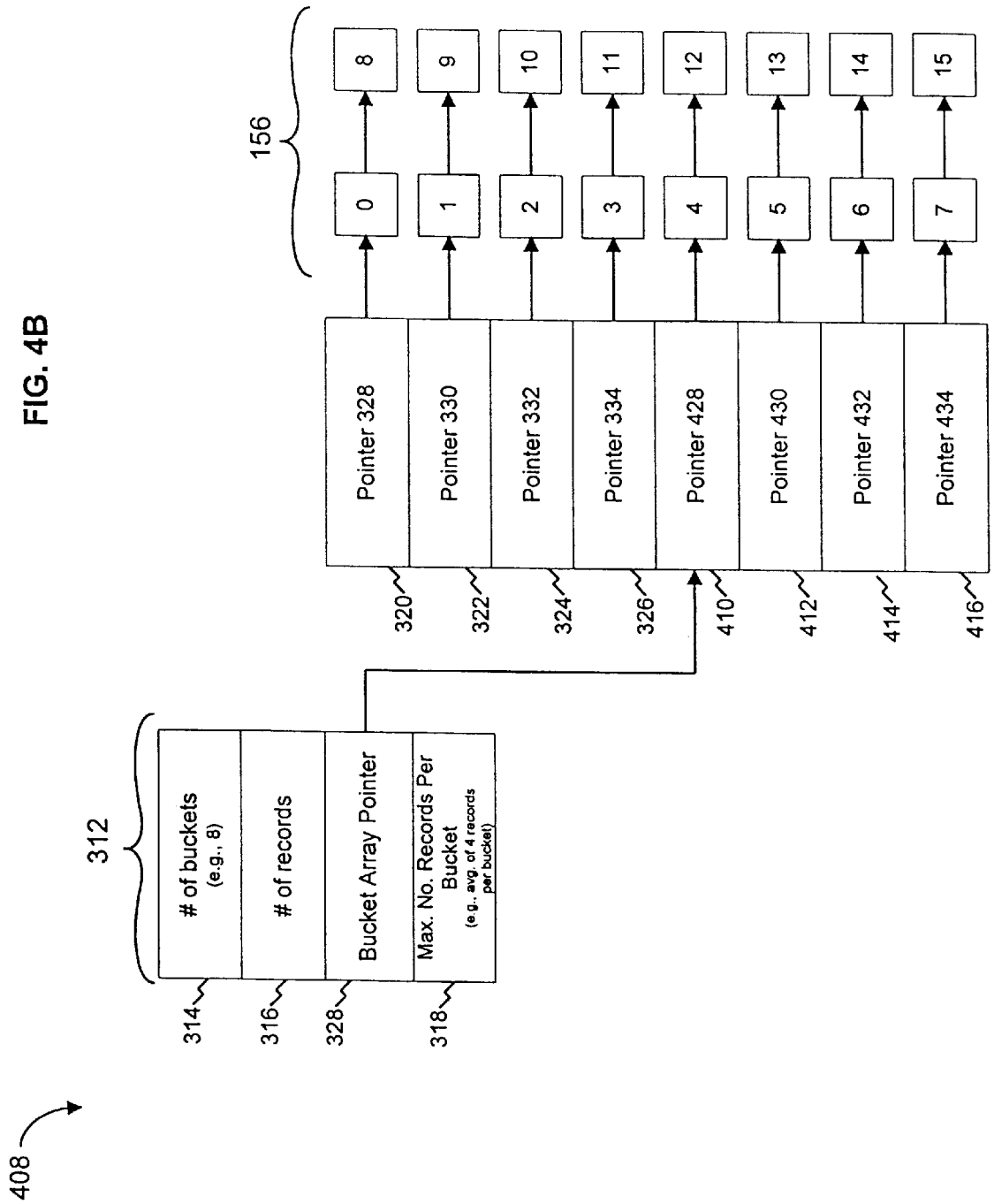
FIG. 4B is a block diagram of the dynamically-sizable hash table of FIG. 4A, after the data records are re-hashed.

Referring to FIG. 4B, in step 818, data records 156 are re-hashed according to the same algorithm previously employed by hash table 310. The only difference in the hashing algorithm is the number of buckets value stored in block 314, which is now 8.

In one embodiment, step 816 is performed by allocating a new hash table, and step 818 is performed by re-hashing data records 156 from the old hash table to the new hash table. Alternatively, step 816 can be performed by allocating new buckets 410–416 to the existing hash table and by changing the number of buckets in block 314, and step 818 can be performed by re-hashing data records 156 from buckets 320–326 to buckets 320–326 and 410–416.

In this example, re-sizing module 342 increases the number of hash buckets as a power of two. As is well known in the art, when the number of hash buckets is an even power of two, modulo algorithms can be employed to provide the advantage illustrated in FIGS. 3 and 4. Namely, when re-hashing data records 156, not all of the data records are moved. In fact, where, as here, data records 156 are evenly distributed and the number of hash buckets is doubled, only half of the data records need to be moved. If the number of buckets is quadrupled, three quarters of the record would need to be moved.

Modulo computations are easy to perform when the value being operated on is a power of two and can be handled as a simple mask operation. Power of two modulo functions are thus cost-effective and efficient to perform in a computer. Alternatively, any other suitable hashing algorithm could be employed.

After data records 156 are re-hashed, processing returns to step 812 where data records can be searched and/or added to re-sized hash table 410. If the number of records in re-sized hash table 410 increase beyond the maximum number in box 318, re-sized hash table 410 can be re-sized again to accommodate additional records.

4. Lazy Re-hashing of a Dynamically Sized Hash Table

Where the number of data records 156 is large, re-hashing of data records 156 in step 818 can take too long to be practical. Thus, the present invention also provides a lazy re-hashing or reorganizing algorithm for slowly re-hashing data records over time.

Figure 5A:
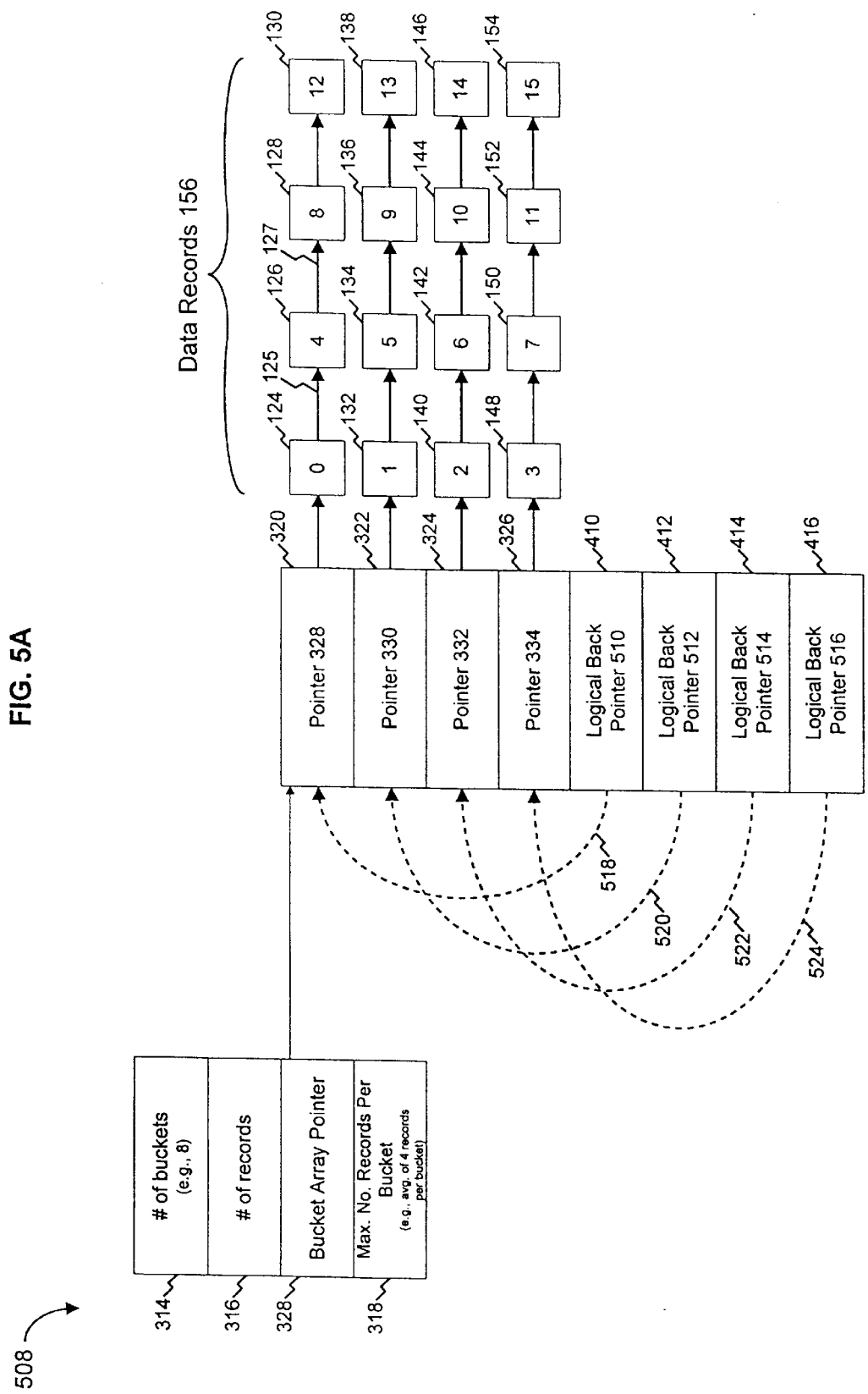
FIG. 5A is a block diagram of a dynamically-sizeable hash table that employs a lazy re-hashing algorithm and logical back pointers, in accordance with the present invention.
Figure 5B:
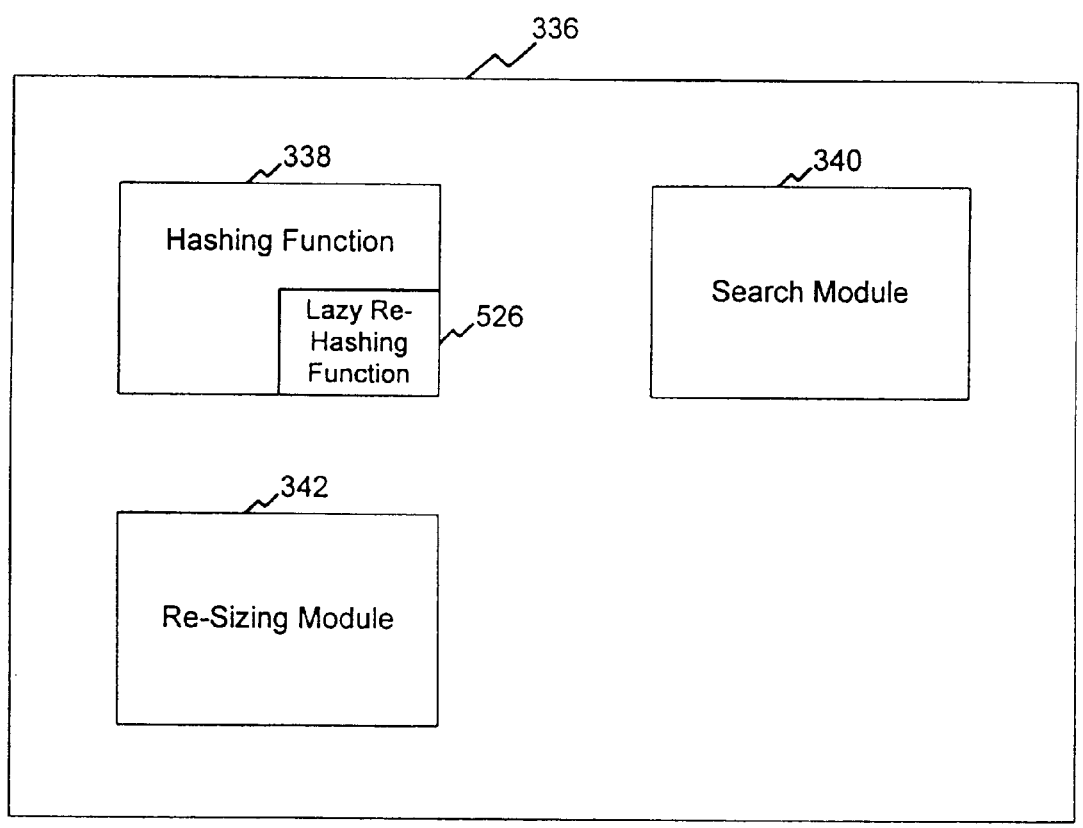
FIG. 5B is a block diagram of the hashing module illustrated in FIG. 3B and including a lazy re-hashing function, in accordance with the present invention.

Referring to FIGS. 5A, 5B, 6, 7 and 11, hash table 310 is dynamically resized as hash table 508, wherein data records 156 are re-hashed according to a lazy re-hashing function. Referring to FIG. 5B, a lazy re-hashing function 526 can be implemented as part of hashing function 338 to re-hash data records 156 as data records 156 are searched as part of a normal hashing operation.

Referring to FIG. 5A, hash table 310 is re-sized as hash table 508 by adding new buckets 410–416 when the number of data records 156 exceed a preset value in box 318. Hash table 310 is grown so that the new number of hash buckets is a multiple of the previous number of hash buckets.

Instead of aggressively re-hashing data records 156 from hash buckets 320–326 to buckets 320–416, as illustrated in FIG. 4B, logical back pointers, or indexes, 510–516 are placed in new buckets 410–416, in place of pointers 428–434. Logical back pointers 510–516 point to existing hash buckets 320–326, respectively, as illustrated by dashed lines 518–524, and act as flags to redirect a search of a new bucket to a pre-existing bucket.

In one embodiment, the size difference between logical back pointers 510–516 and regular pointers 328–334 are used to flag the system. More specifically, logical back pointers 510–516 are indexes to other buckets while regular pointers 125, 127, 328–334, are typically full memory addresses. Since full-fledged addresses are very large, for example, 64 bits, the sheer size difference between a small logical back pointer and a full-fledged address pointer provides the necessary flag that distinguishes a regular pointer from a logical back pointer. Alternatively, any other type of flagging system can be employed.

In operation, when a key value is submitted to hashing function 338, hashing function 338 identifies a first bucket that potentially stores a record having the key value. Search module 340 then searches the first bucket for a data record that contains the key value. If a bucket or a record includes a logical back pointer rather than a regular pointer, the logical back pointer re-directs the search to a second bucket and initiates lazy re-hashing function 526. When data records in the second bucket are searched by search module 340, lazy re-hashing function 526 examines the key value in the record being searched and determines whether the record belongs in the first bucket instead of the second bucket. If so, lazy rehashing function 526 re-hashes the data record to the first bucket.

When lazy re-hashing function 526 re-hashes a record from the second bucket to the first bucket, it also moves the logical back pointer from the first bucket to the moved record and places a regular pointer to the record in the first bucket so that a subsequent search of the first bucket will be directed to the moved record first, and then to the second bucket according to the logical back pointer. For example, referring to FIG. 6, when data record 126 is moved from bucket 320 to bucket 410, logical back pointer 510 is moved from bucket 410 to record 126, as indicated by dashed line 518.

After the last data record in the second bucket is searched, any records in the second bucket that belong in the first bucket will have been moved. At that point, the logical back pointer in the first bucket is removed. For example, referring to FIG. 7, after data record 130 is moved from bucket 320 to bucket 410, logical back pointer 510 is removed.

Dynamically sizeable hash table 508 can be re-sized again (by a multiple of the previous number of hash buckets), before the lazy re-hashing of data records 156 has been completed for the first re-sizing. When this happens, logical back pointers can redirect a search through multiple buckets. For example, referring to FIG. 11, hash table 508 is re-sized as hash table 1110. Hash table 1110 includes new buckets 1112–1126 having logical back pointers 1128–1142. Logical back pointer 1142 in new bucket 1126, for example, points to bucket 416 which contains logical back pointer 516, which points to bucket 326. Thus, a search directed to new bucket 1126 will be re-directed to bucket 516 and then to bucket 326. In this case, logical back pointers 1142 and 516 cannot be deleted until the lazy re-hashing code has followed the whole chain to its end.

Figure 9:
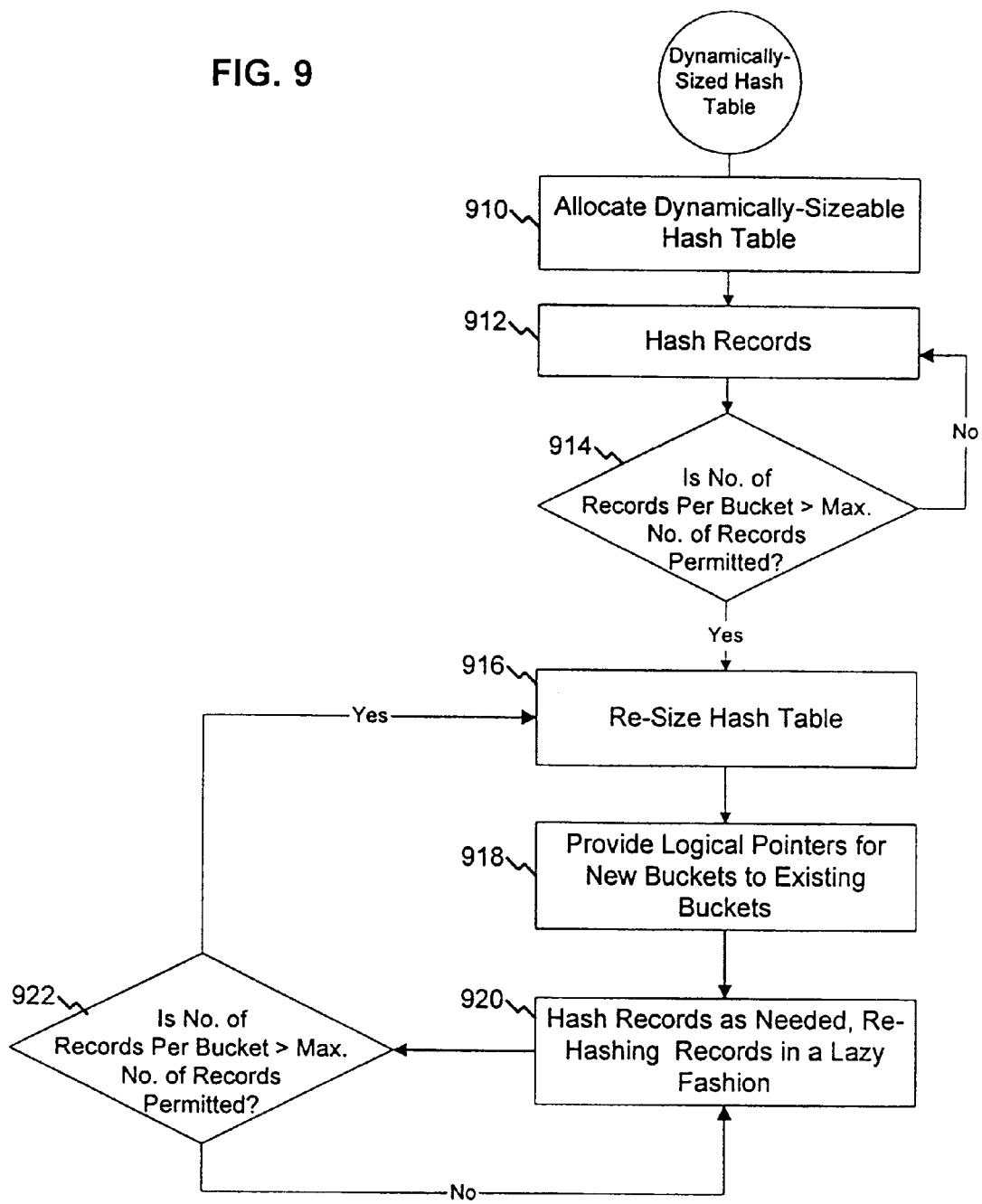
FIG. 9 is a process flowchart illustrating a method for dynamically resizing a hash table using a lazy re-hashing algorithm, in accordance with the present invention.

Referring to FIG. 9, a process flowchart is provided to illustrate a preferred method for re-hashing data records 156 in a lazy fashion. Processing begins in step 910, where dynamically sizable hash table 310 is allocated substantially as described in step 810. In step 912, data records are hashed in hash table 310, substantially as described in step 812. When necessary, hash table 310 is re-sized in steps 914 and 916, substantially as described in steps 814 and 816 with respect to FIG. 4A, except that here, re-sizing is performed so that the number of buckets is a multiple of the previous number of buckets. Thus, in FIG. 5A, the total number of buckets has doubled from four to eight.

Referring to FIG. 5, in step 918, instead of aggressively, or immediately, re-hashing data records 156, as in step 818 and as illustrated in FIG. 4B, new hash buckets 410–416 are provided with logical back pointers 510–516, respectively. In step 920, data records 156 are re-hashed from hash buckets 320–326 to hash buckets 320–416 in a lazy fashion, (i.e., as data records are searched). Thus, in step 920, since aggressive re-hashing is avoided, hashing operations can be performed on dynamically re-sized hash table 508 immediately after it is re-sized. Data records that are never searched again are not re-hashed, saving valuable time and resources.

Figure 10:
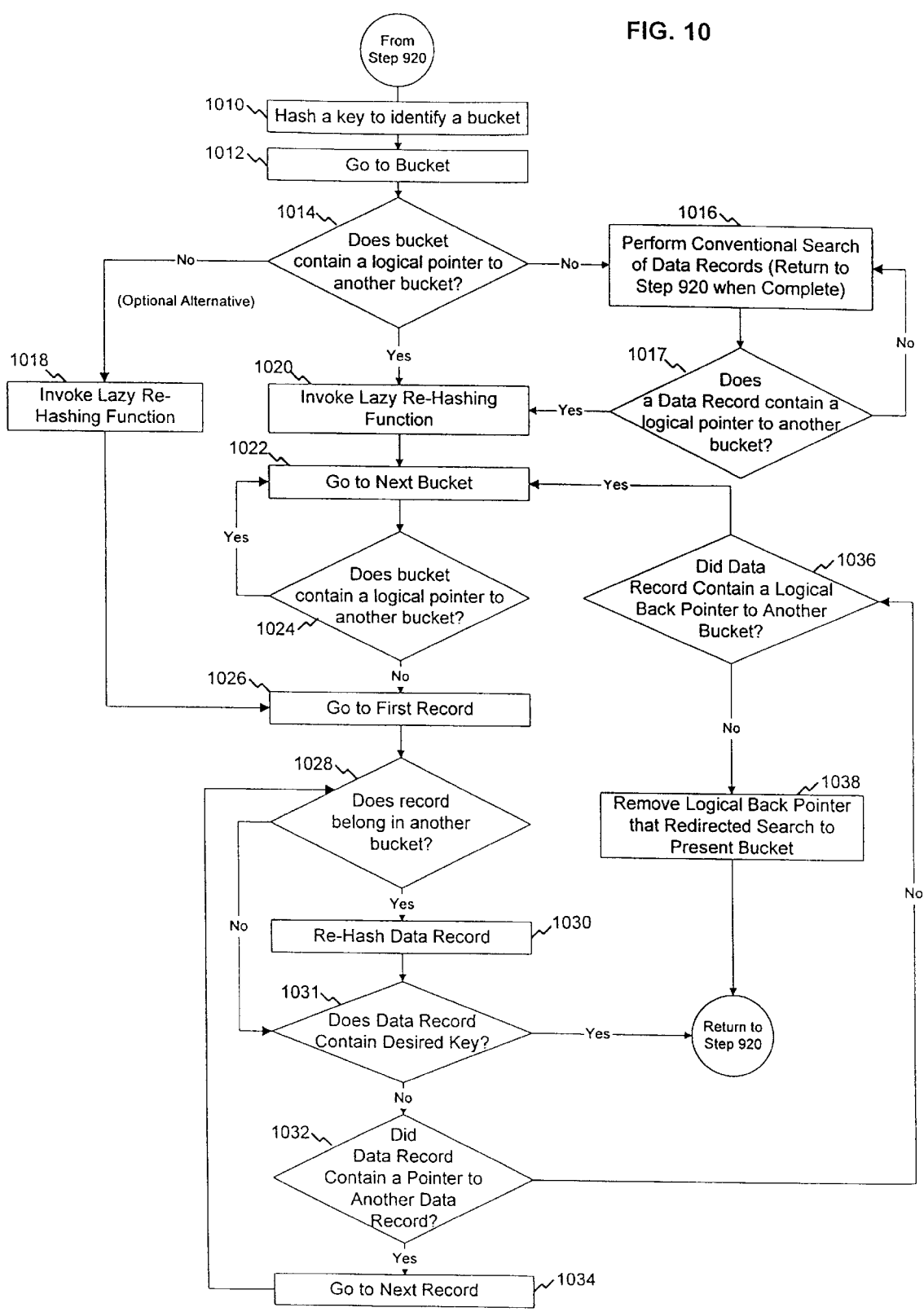
FIG. 10 is detailed process flowchart illustrating a method for dynamically re-sizing a hash table using a lazy re-hashing algorithm, in accordance with the present invention.
Figure 11:
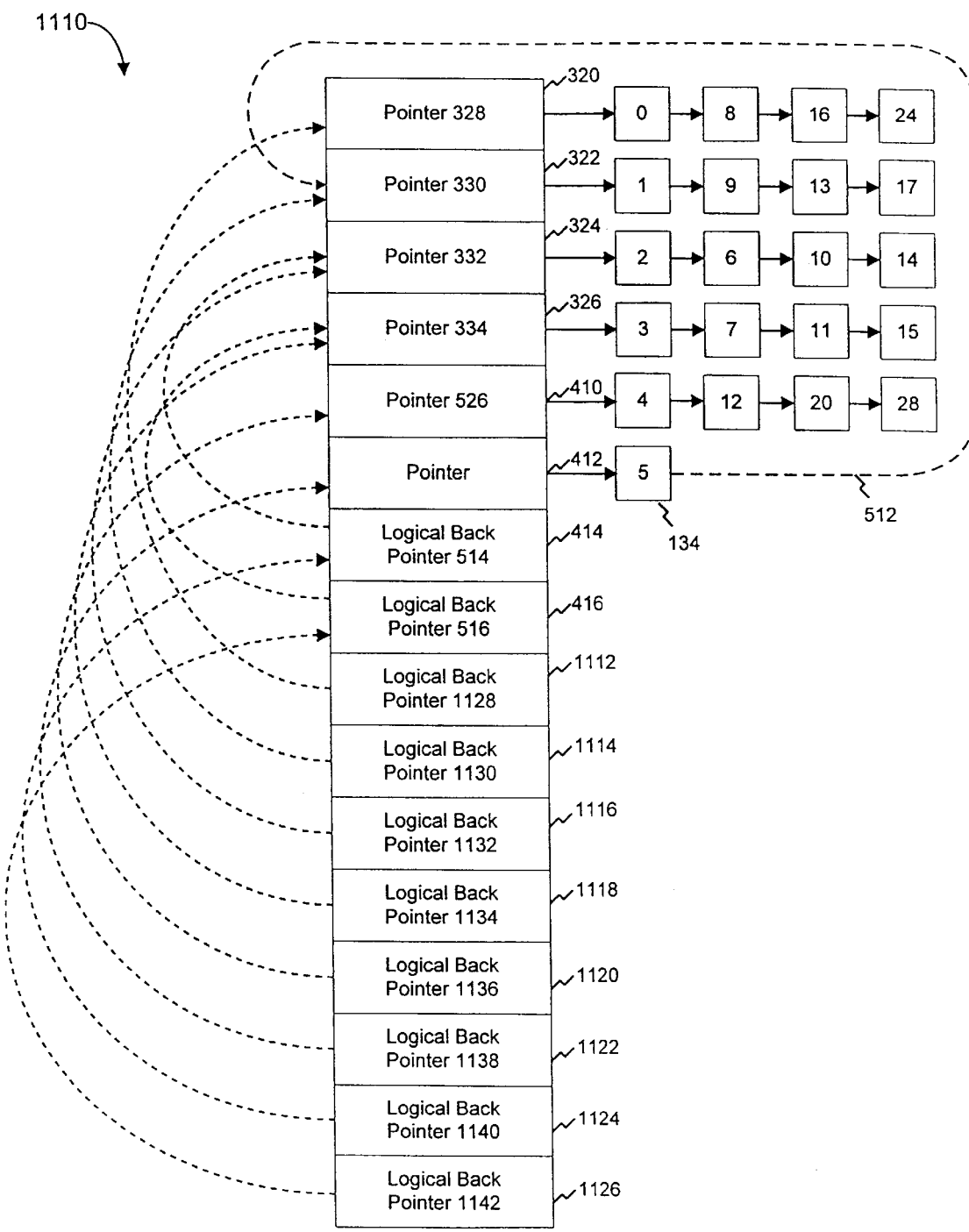
FIG. 11 is a block diagram of the dynamically-sizeable hash table illustrated in FIG. 5A after it has been re-sized a second time, prior to completion of a lazy re-hashing of data records following a first re-sizing, in accordance with the present invention.

Referring to FIG. 10, a preferred method for re-hashing records in a lazy fashion is provided. The process is described with reference to FIG. 5A. The process begins at step 1010, where a key is hashed to identify a bucket that potentially contains the record associated with the key. For example, when a key value of four is supplied to hash table 508, the hashing algorithm points to hash bucket 410.

In step 1012, search module 340 is directed to the identified hash bucket. In step 1014, search module 340 determines whether the identified hash bucket contains a regular pointer, such as regular pointers 328–334 or a logical back pointer such as logical back pointers 510–516. Since hash bucket 410 contains logical back pointer 510, processing proceeds to step 1020, where lazy re-hashing function 526 is invoked. Once invoked, lazy re-hashing function 526 examines each record that is searched by search module 340.

In step 1014, if the hash bucket contains a regular pointer, processing proceeds to step 1016 where a conventional search is performed on the linked list of data records associated with the identified bucket. At the conclusion of the search, processing returns to step 920 for additional hash operations. At any point during the conventional search, if a data record is found that contains a logical back pointer, the logical back pointer flags the system in step 1017 to initiate a jump to step 1020.

Alternatively, in step 1014, when the hash bucket contains a regular pointer, processing can proceed to step 1018 rather than step 1016, where lazy rehashing function 526 is invoked, and then to step 1026 for searching the first data record. This alternative can be implemented so that lazy re-hashing finction 526 is invoked for every search operation.

In step 1022, search module 340 is redirected to the bucket that is identified by the logical back pointer, which in this example is bucket 320. In step 1024, search module 340 determines whether the hash bucket contains a regular pointer or a logical back pointer. If the hash bucket contains a logical back pointer, processing returns to step 1022, where search module 340 is redirected to the bucket identified by the logical back pointer.

Steps 1022 and 1024 can be repeated any number of times. For example, in FIG. 11, search module 340 can be initially directed to bucket 1126 in step 1012, re-directed to bucket 416 in step 1022 by logical back pointer 1142 and re-directed to bucket 326 by logical back pointer 516. When a hash bucket contains a regular pointer, processing proceeds to step 1026, where search module 340 is directed to the first data record identified by the regular pointer. Referring back to FIG. 5A, pointer 328 directs search module 340 to data record 124.

In step 1028, lazy re-hashing function 526 determines whether the data record belongs in another bucket. If so, processing proceeds to step 1030 where the data record is re-hashed. If not, processing jumps to step 1031.

Figure 6:
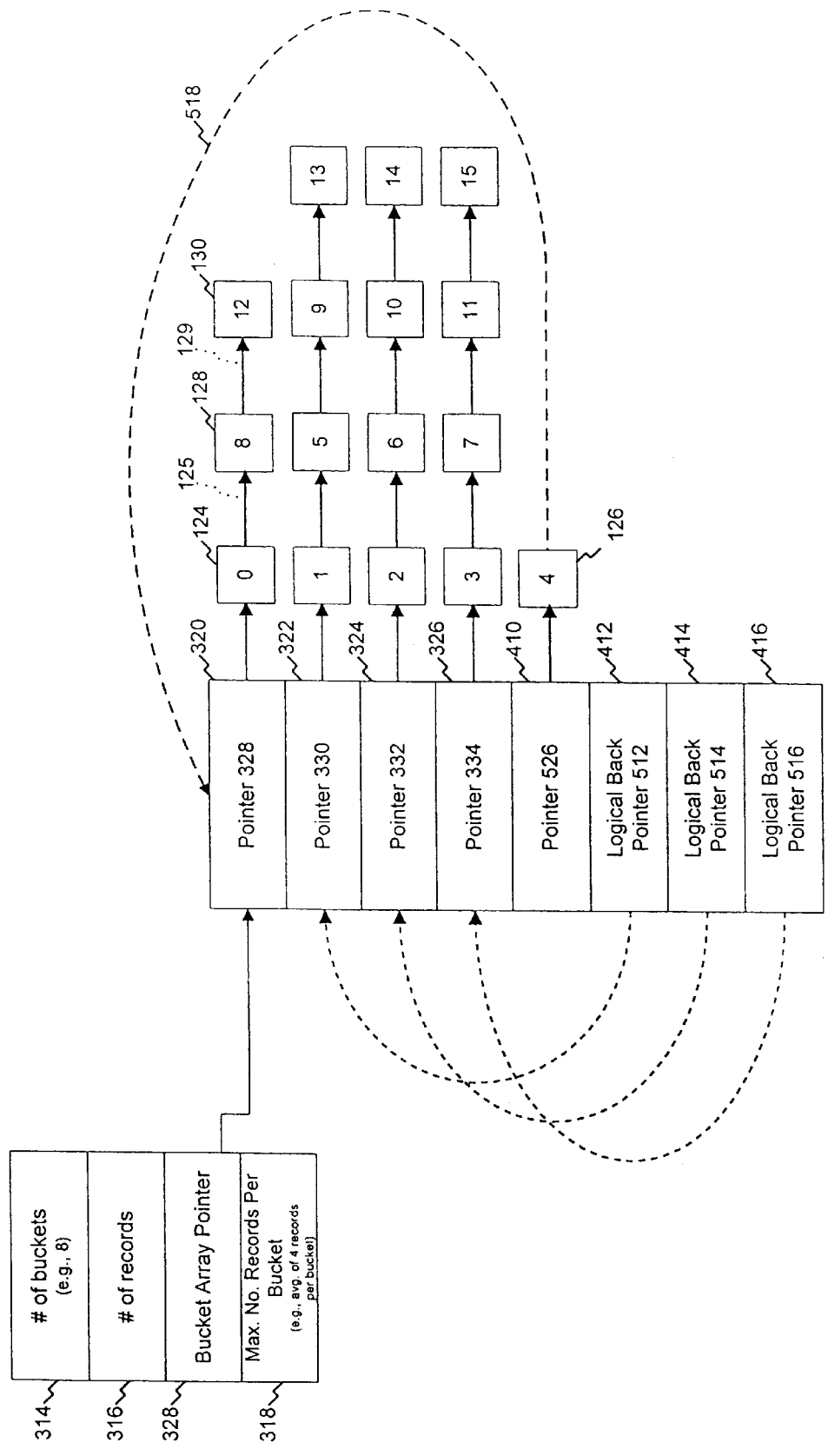
FIG. 6 is a block diagram of the dynamically-sizeable hash table illustrated in FIG. 5A, further illustrating a lazy re-hashing of a data record.
Figure 7:
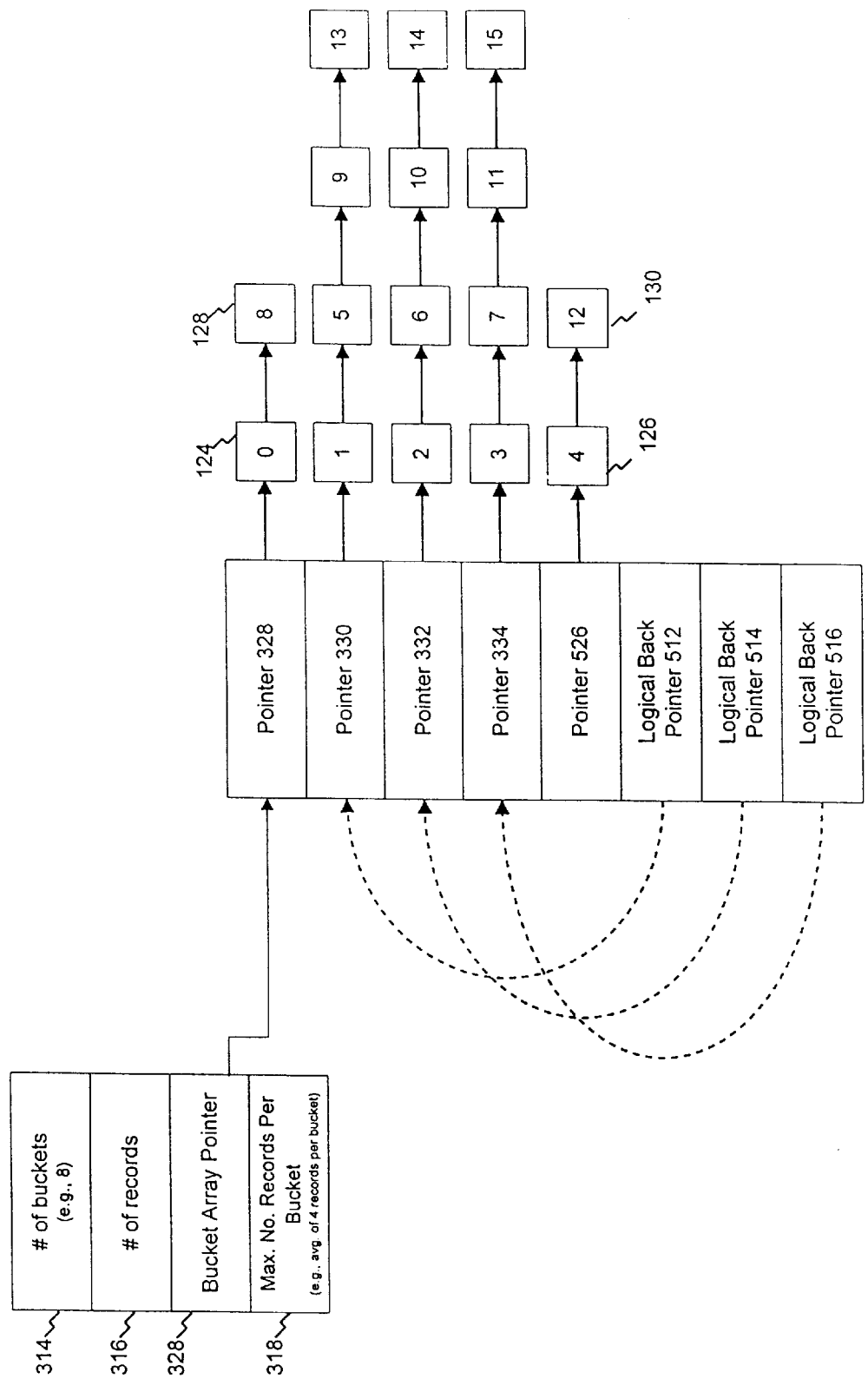
FIG. 7 is a block diagram of the dynamically-sizeable hash table illustrated in FIG. 5A, further illustrating removal of a logical back pointer after all records in a bucket have been rehashed.

Referring to FIG. 6, since data record 126 belongs in bucket 410, lazy rehashing function 526 re-hashes it in step 1030. Re-hashing can include, for example, updating regular pointers and logical back pointers. In this example, in bucket 410, logical back pointer 510 is replaced with regular pointer 526 and regular pointer 127 in data record 126 is replaced by logical back pointer 510, as illustrated by dashed line 518. In bucket 320, regular pointer 125 is updated to link data record 124 to data record 128.

In step 1031, search module 340 determines whether the data record contains the key value that was hashed in step 1010. If so, a positive response is provided to the requestor and processing returns to step 920 for additional hash operations. Alternatively, processing can proceed to step 1032 in order to re-hash any other records in bucket 320 that belong in another bucket.

In step 1032, search module 340 determines whether the record that was just searched contained a pointer to another record. If so, processing proceeds to step 1034 where search module 340 is directed to the record. Processing then returns to step 1028, where lazy re-hashing function 526 determines whether the data record belongs in another bucket.

In step 1032, if the record did not point to another record, processing proceeds to step 1036 where search module 340 determines whether the data record contained a logical back pointer. Alternatively, any of steps 1032 and 1036 can be performed prior to re-hashing in step 1030.

In step 1036, if the data record did not contain a logical back pointer, processing proceeds to step 1038 where the logical back pointer that redirected search module 340 to the current bucket is removed. Thus, since the record did not point to another record and did not contain a logical back pointer to another bucket, every record in the logical link has been searched and, where necessary, re-hashed to a proper bucket. As a result, there is no longer a need for a logical back pointer to the present bucket. For example, referring to FIG. 7, when data record 130 is re-hashed from bucket 320 to bucket 410 in step 1030, and since data record 130 did not contain a regular pointer or a logical back pointer, logical back pointer 518 is removed from record 126. Processing then returns to step 920 for additional hashing operations.

In step 1036, if the data record did contain a logical back pointer to another bucket, processing returns to step 1022 where search module 340 is directed to the next bucket. For example, referring to FIG. 11, where a search initiates at bucket 1122 and is redirected to bucket 412 by logical back pointer 1138, after data record 134 is searched in step 1026, logical back pointer 512 returns processing to step 1022.

Referring back to step 920, when a new record is hashed in hash table 508, processing proceeds to step 922 which is, essentially, a repeat of step 914. In step 922, re-sizing module 342 determines whether hash table 508 needs to be re-sized to accommodate the new data record (i.e., to maintain the desired ratio of data records to hash buckets).

If the hash table needs to be re-sized, processing proceeds to step 916, where additional buckets are added as necessary. The number of new buckets is a multiple of the number of pre-existing buckets. For example, referring to FIG. 11, new data buckets 1112–1126 are added. In step 918, logical back pointers 1128–1142 are provided to new buckets 1112–1126. Subsequent searches can be redirected through multiple buckets in order to get to a bucket that potentially contains a desired data record.

5. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for dynamically sizing a hash table in a processor, comprising the steps of:
   (1) allocating a hash table having a number n of hash buckets;
   (2) hashing records into the hash table;
   (3) re-sizing the hash table when an actual number of records in the hash table exceeds a limit; and
   (4) re-hashing the records in the hash table after the hash table is re-sized using a lazy re-hashinz algorithm wherein a logical pointer is associated with a new hash bucket and the logical pointer points to a pre-existing hash bucket that potentially contains records that belong in the new hash bucket.

2. The method according to claim 1, wherein step (2) comprises:
   (a) hashing the records using a modulo hashing function.

3. The method according to claim 1, wherein step (3) comprises:
   (a) increasing the number of hash buckets by a multiple of a preexisting number of hash buckets.

4. The method according to claim 1, wherein step (4) comprises:
   (i) searching the new hash bucket for a record;
   (ii) using the logical pointer associated with the new hash bucket to identify the pre-existing hash bucket;
   (iii) searching the pre-existing bucket for the record; and
   (iv) re-hashing records that are searched in the pre-existing bucket and that belong in the new bucket.

5. The method according to claim 4 wherein step (4) comprises storing the logical pointer within the new hash bucket in place of a regular pointer to a record.

6. The method according to claim 5, wherein step (4) further comprises the step of:
   (v) moving the logical pointer to a record that has been re-hashed to the new hash bucket and placing a regular pointer to the record that has been re-hashed in the new hash bucket.

7. The method of claim 4, wherein step (4) further comprises the step of:
   removing the logical pointer when there are no more records in the existing bucket that belong in the new bucket.

8. A system for dynamically sizing a hash table of records in a processor, comprising:
   a hashing function that generates a hash table having a number of buckets n and that hashes records into the buckets based on a key value associated with each record;
   a re-sizing module that dynamically re-sizes the hash table when an actual number of records in the hash table exceeds a limit; and
   a lazy re-hashing function that re-hashes the records using a lazy re-hashing algorithm, wherein a logical pointer is associated with a new hash bucket and the logical pointer points to a pre-existing hash bucket that potentially contains records that belong in the new hash bucket.

9. The system according to claim 8, wherein said hashing function comprises a modulo hashing function.

10. The system according to claim 9, wherein said re-sizing module comprises:
    means for increasing the number of hash buckets by a multiple of a preexisting number of hash buckets.

11. The system according to claim 10, further comprising:
    means for using the logical pointer in the new hash bucket to identify and search the pre-existing hash bucket when the new hash bucket is searched for a record; and
    means for using the logical pointer in the new hash bucket to flag said lazy re-hashing function to re-hash a record in the pre-existing hash bucket that is searched and that belongs in the new bucket.

12. The system according to claim 11, further comprising:
    means for storing the logical pointer in the new hash bucket in place of a regular pointer to a record.

13. The system according to claim 12, further comprising:
    means for moving the logical pointer to a record that has been re-hashed to the new hash bucket and for placing a regular pointer to the record that has been re-hashed in the new hash bucket.

14. The method of claim 13, further comprising:
    means for removing the logical pointer when there are no more records in the pre-existing bucket that belong in the new bucket.

15. A computer program product comprising a computer useable medium having computer program logic stored therein, said computer program logic for enabling a computer to dynamically re-size a hash table, wherein said computer program logic comprises:
    means for enabling the computer to allocate a hash table having a number n of hash buckets;
    means for enabling the computer to hash records into the hash table;
    means for enabling the computer to re-size the hash table when an actual number of records in the hash table exceeds a limit; and
    means for enabling the computer to re-hash the records in the hash table after the hash table is re-sized using a lazv re-hashing algorithm, wherein a logical pointer is associated with a new hash bucket and the logical pointer points to a pre-existing hash bucket that potentially contains records that belong in the new hash bucket.

16. The computer program product according to claim 15, wherein said means for enabling the computer to hash records into the hash table comprises:
    means for enabling the computer to hash the records using a modulo hashing function.

17. The computer program product according to claim 16, wherein said means for enabling the computer to re-size the hash table comprises:
    means for enabling the computer to increase the number of hash buckets by a multiple of a pre-existing number of hash buckets.

18. The computer program product according to claim 17, wherein said means for enabling the computer to re-hash the records in the hash table after the hash table is re-sized using a lazv re-hashing algorithm comprises:
    means for enabling the computer to search the new hash bucket for a record;
    means for enabling the computer to use the logical pointer associated with the new hash bucket to identify the pre-existing hash bucket,
    means for enabling the computer to search the pre-existing bucket for the record; and
    means for enabling the computer to re-hash records that are searched in the pre-existing bucket and that belong in the new bucket.

19. The computer program product according to claim 18, further comprising:

means for enabling the computer to store the logical pointer within the new hash bucket in place of a regular pointer to a record.

20. The computer program product according to claim 19, ftirther comprising:

means for enabling the computer to move the logical pointer to a record that has been re-hashed to the new hash bucket and for enabling the computer to place a regular pointer to the record that has been re-hashed in the new hash bucket.

21. The computer program product according to claim 20, further comprising:

means for enabling the computer to remove the logical pointer when there are no more records in the existing bucket that belong in the new bucket.

22. The method according to claim 1, wherein step (4) comprises:

(a) re-sizing the hash table when the actual number of records in the hash table, divided by the number of buckets n, exceeds a limit of a maximum average number of records per hash bucket.

23. The system according to claim 8, wherein said re-sizing module dynamically re-sizes the hash table when the actual number of records in the hash table, divided by the number of buckets n, exceeds a limit of a maximum average number of records per hash bucket.

24. The computer program product according to claim 15, wherein said means for enabling the computer to re-size the hash table comprises:

means for enabling the computer to re-size the hash table when the actual number of records in the hash table, divided by the number of buckets n, exceeds a limit of a maximum average number of records per hash bucket.

* * * * *